April 4, 1967     S. ZELL     3,312,023
ANTI-CONDENSATION PANELS
Filed Oct. 8, 1964
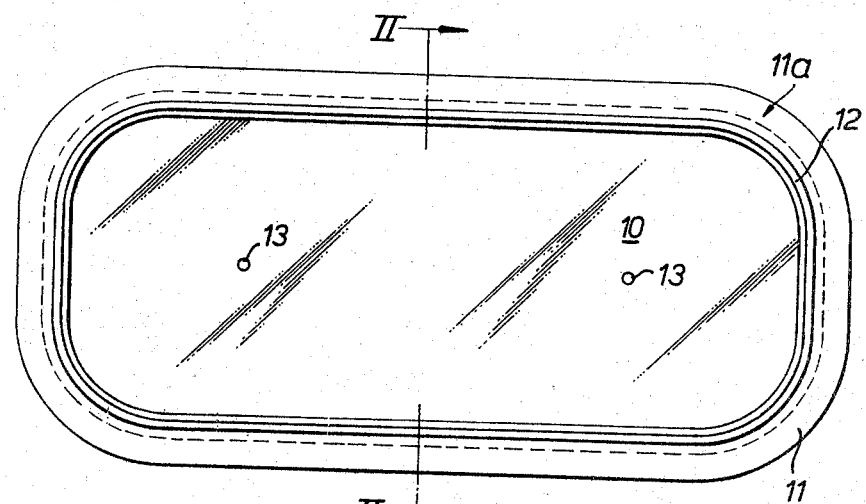
—FIG. 1.—
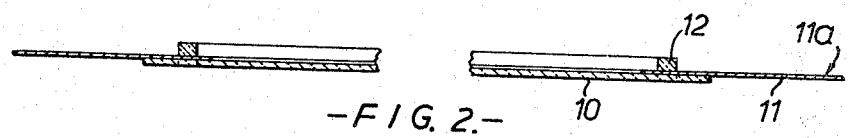
—FIG. 2.—
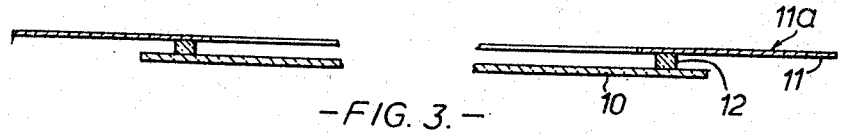
—FIG. 3.—
INVENTOR:
SALOMON ZELL United States Patent Office 3,312,023
Patented Apr. 4, 1967

3,312,023
ANTI-CONDENSATION PANELS
Salomon Zell, Blackpool, England, assignor to Zell-Em Limited, Blackpool, England, a British company
Filed Oct. 8, 1964, Ser. No. 402,458
Claims priority, application Great Britain, Mar. 6, 1964, 9,488/64
4 Claims. (Cl. 52—203)

This invention is concerned with improvements in or relating to anti-condensation or anti-mist panels for attachment to screens or windows, particularly glass screens or rear windows of motor vehicles.

It is an object of the present invention to provide an anti-condensation panel for attachment to a window comprising a flat sheet of stiffish but to some extent flexible transparent plastic material having a peripheral border element which includes a flange of flexible plastics material which projects outwardly of the periphery of the transparent sheet and has at least one surface highly polished so as to render it self-adhesive to the window, and a spacing frame extending around the transparent sheet close to the periphery thereof and secured thereto so as to be on the same side of the panel as the highly polished surface of the border element flange whereby when said highly polished surface of the flange is applied to the window and adhered thereto, the sheet of transparent material is held in spaced relationship from the window and a sealed air space is formed between the transparent sheet and the window to prevent misting of the latter.

In one embodiment of the invention there is provided an anti-condensation or anti-mist panel for attachment to screens or windows which comprises a panel proper consisting of a flat sheet of stiff but flexible transparent plastic material and a panel frame applied to the peripheral portion of the panel proper and incorporating a border element of flexible plastic material having a portion projecting beyond the periphery of the panel proper and having at least one surface highly polished so as to render it self-adhesive to the screen or window, and a spacing frame or rib located close to the periphery of the panel proper.

Preferably the border element is attached to the panel proper and the spacing frame or rib is attached to that portion of the border element attached to the panel proper. Alternately the spacing frame can be attached to the panel proper and the border element attached to the spacing frame. The spacing frame preferably is flexible so that the panel can conform to the contour of the window to which it is attached.

The border element is preferably formed from a flexible sheet of polyvinyl chloride which sheet is relatively thin in relation to the flat sheet forming the relatively stiff but flexible panel. This latter sheet also is preferably formed from polyvinyl chloride material, but can, for example, also be formed from cellulose acetate. The term "self-adhesive" as used in relation to the border element refers to that known property of a high polished surface of plastics material by which said surface when pressed against another smooth surface will adhere thereto without the use of any extraneous adhesive.

The flat sheet may be tinted or coloured if desired to provide a degree of protection against glare or dazzle and if it is intended to cover a relatively large area may be provided with small disc-shaped protuberances or bosses, centrally located, to assist in preventing the panel sagging against the supporting surface to which the panel is attached.

The component members of the complete anti-condensation or anti-mist panel may be secured together in any convenient manner, for example where polyvinyl chloride materials are being used these may be attached to each other by heat sealing methods or welding techniques e.g. high frequency welding but attachment by adhesives may also be applied where desirable.

The spacing frame or rib is conveniently attached to the flat stiff sheet of the panel with the inner portion of the border element sandwiched between them so that it is located close to the inner edges of the border element. This spacing frame or rib may also be formed from plastic material, suitably polyvinyl chloride or acrylic resin or it may be of synthetic or natural rubber or metal. The spacing frame may be solid in construction but may be slotted or otherwise recessed so as to be capable of receiving the inner edge of the border element. Alternatively, a relatively thick sheet of material may be folded to provide a channel-sectioned member which embraces the inner edge of the border element. The border element may be joined to the spacing frame, where its edge is embraced by the latter, by means of a suitable adhesive.

Attachment of the panel to a window or screen is effected by pressing the highly polished surface of the framing member onto the surface of the window or screen, the spacing frame or rib, together with the additional disc-shaped bosses or protuberances where employed, ensuring that the body of the panel is held in spaced relationship from said window surface.

The invention will now be described by way of example with reference to preferred embodiments which are illustrated in the accompanying drawing wherein, FIGURE 1 is a plan view of the complete anti-mist panel, FIGURE 2 is a sectional view along the lines II—II of FIGURE 1, and FIGURE 3 is a sectional view similar to that of FIGURE 2 showing an alternative form of construction.

Referring to FIGURES 1 and 2, a flat sheet of stiff but flexible transparent polyvinyl chloride 10 has attached thereto by high frequency welding a border element 11 of transparent polyvinyl chloride material which is also flexible and which has a highly polished surface 11a. The portions of this surface 11a which extend beyond the periphery of the panel proper 10 are pressed against the surface of the window or screen so as to secure the complete panel thereto. A flexible spacing frame or rib 12 of polyvinyl chloride is then secured to the surface 11a by high frequency welding. Disc-shaped bosses 13 are secured to the panel proper 10.

In the alternative construction shown in FIGURE 3 the spacing frame or rib 12 is secured directly to the panel proper 10 and the border element 11 then secured to spacing member 12.

From a structural standpoint, the planar shape, configuration and size of the panel is immaterial, with the shown shape being merely exemplary.

The border element and spacing frame may be formed as an integral unit but may also be formed by attaching two or more portions in appropriate positions to the panel proper.

The construction of the anti-mist or anti-condensation panels of the present invention enables them to be used with any type of vehicle rear window whether flat or curved in any way.

I claim:
1. A lightweight anti-condensation panel for attachment to a window, comprising a flat sheet of flexible transparent plastic material having sufficient stiffness to be substantially self-supporting throughout its area, a peripheral border element of thin flexible plastic material, the inner edge of which overlaps the edge portion of the sheet and the outer edge portion of which is disposed outwardly beyond the periphery of said sheet and defining a border flange, one surface of said border flange being highly polished to be self-adherent to a window, and a spacing frame extending around said transparent sheet adjacent the periphery thereof, said border element, spacing frame and sheet being sealed together in airtight relation with the adherent border flange surface and spacing frame facing from the same side of said sheet, said spacing frame being flexible to conform to any contour of a window, whereby when said adherent border flange surface is applied to a window the spacing frame enables said panel to follow the contour of the window with the sheet of transparent material spaced from the window and a sealed air space is formed between the transparent sheet and the window to prevent misting of the latter.

2. A panel according to claim 1 wherein said border element is interposed between said sheet and said spacing frame.

3. A panel according to claim 1 wherein said spacing frame is interposed between said sheet and said border element.

4. A panel according to claim 1 wherein said spacing frame is composed of plastic material.

References Cited by the Examiner
UNITED STATES PATENTS

| | | | |
|---|---|---|---|
| 2,111,350 | 3/1938 | Atwood | 20—40.5 |
| 2,212,095 | 8/1940 | Erickson et al. | |
| 2,267,542 | 12/1941 | Walz | 20—40.5 |
| 2,293,887 | 8/1942 | Chamberlain | 40—142 X |

BENJAMIN HERSH, *Primary Examiner.*

J. A. PEKAR, *Assistant Examiner.*